(12) United States Patent
Freeman

(10) Patent No.: US 7,731,307 B1
(45) Date of Patent: Jun. 8, 2010

(54) SEAL GUARD FOR COMPACTOR

(76) Inventor: Ernie Freeman, 3467 Kings Mill Run, Rocky River, OH (US) 44116

( * ) Notice: Subject to any disclaimer, the term of this patent is extended or adjusted under 35 U.S.C. 154(b) by 73 days.

(21) Appl. No.: 11/946,167

(22) Filed: Nov. 28, 2007

(51) Int. Cl.
*B62D 25/16* (2006.01)
*A01B 17/00* (2006.01)

(52) U.S. Cl. .................................. 305/107; 172/508

(58) Field of Classification Search ................ 305/100, 305/107–111, 115; 404/129; 172/558–559
See application file for complete search history.

(56) References Cited

U.S. PATENT DOCUMENTS

| | | | |
|---|---|---|---|
| 4,818,040 A * | 4/1989 | Mezzancella et al. | ....... 305/107 |
| 5,330,260 A | 7/1994 | Freeman | |
| 5,451,100 A | 9/1995 | Freeman | |
| 5,553,932 A | 9/1996 | Freeman | |
| 5,820,230 A | 10/1998 | Freeman | |
| 5,951,123 A * | 9/1999 | Bomstad et al. | ............. 305/107 |
| 5,967,242 A * | 10/1999 | Caron et al. | ................ 305/110 |
| 6,293,631 B1 | 9/2001 | Freeman | |
| 6,322,170 B1 * | 11/2001 | Knell et al. | .................. 305/107 |
| 6,371,578 B1 * | 4/2002 | Ferguson | ..................... 305/107 |
| 7,556,323 B1 * | 7/2009 | Gachhadar et al. | .......... 305/107 |
| 2002/0140287 A1 | 10/2002 | Fee et al. | |

OTHER PUBLICATIONS

CAT Service Information System, 148-2344 Axle GP-Oscillating-Rear, 2 pgs., Copyright 1993—2007 Caterpillar Inc.
CAT Service Information System, 148-2346 Axle GP-Fixed-Front, 2 pgs., Copyright 1993—2007 Caterpillar Inc.

* cited by examiner

*Primary Examiner*—Jason R Bellinger
(74) *Attorney, Agent, or Firm*—Pearne & Gordon LLP

(57) ABSTRACT

A guard for the axle seal of a wheeled tractor being an annular steel structure that bridges the plane of the seal between a spindle and final drive including a pair of axially spaced flanges having circular outer peripheries, at least one of the outer peripheries of the flanges being sized to produce a narrow gap seal with a circular interior surface of a wheel rim, a hub extending axially between the flanges and spaced radially inward of said flange outer peripheries, the flanges, hub and interior wheel surface defining an annular space adapted to trap debris.

9 Claims, 3 Drawing Sheets

US 7,731,307 B1

SEAL GUARD FOR COMPACTOR

BACKGROUND OF THE INVENTION

The invention relates to improvements in protective devices for drive lines of heavy equipment operating in adverse environments such as landfills.

PRIOR ART

Compactors in the form of heavy wheeled tractors are used in the landfill industry to compact refuse for full utilization of the landfill space. U.S. Pat. Nos. 5,330,260, 5,451,100, 5,553,932, and 5,820,230 disclose a type of cutting device associated with the wheels of a compactor. The cutter devices operate to sever strands of material that would otherwise wrap around the axle, accumulate and develop excessive friction and/or find their way into a seal area between the rotating and non-rotating parts and destroy the seal. Seal destruction results in expensive drive line repairs and loss of machine time when the compactor is being repaired. The patented cutters have proven to be effective for some machines, but have not been widely adopted on certain large machines that have proven to suffer drive line failures. There has remained a need for a device to effectively protect the wheel seals on large landfill compactors not fitted with cutters of the type disclosed in the aforementioned patents.

SUMMARY OF THE INVENTION

The invention is directed to a novel guard for use at each wheel of a compactor used in a landfill or similar operation. The guard design is inspired, in part, by the realization that a primary source of axle seal failure in such environments is the forced entry of a strand of wire, cable or like high-tensile strength material into the plane of contact of the sealing elements. The guard of the present invention is arranged, as a first measure of wheel seal protection, with mechanical narrow gap seal elements intended to exclude debris, especially stranded material, from entering the zone of the respective wheel seal. As a second measure of defense, the guard is provided with an essentially closed annular space surrounding the seal that is intended to trap any debris that might get past the first mechanical seal. The trap can be especially effective when stranded debris enters the annular zone. This type of debris, to the extent that it is being forcibly wrapped around the axle by motion of the wheel is harmlessly wrapped onto and thereby trapped by a spool-like hub flanged at both its ends. Debris getting past the narrow gap seal is thereby trapped by this wrapping action.

In the disclosed embodiment, the guard is formed as semi-circular segments to enable its installation on an axle without disassembly of the final drive. Additionally, in the preferred embodiment, the guard is provided with two supplemental interior mechanical seals. The seals are in series with each other and with the primary exterior narrow gap seal with reference to the path that any debris must follow to reach the wheel seal. The structures that form the end boundary of the annular debris trapping zone serve to form the interior mechanical guard seals. Additionally, an outboard, cantilever supported, one of the end boundary structures seals with the axle assembly itself. This structure, ideally, is a sufficiently close clearance fit with the axle so that this cantilevered end can be directly supported by the axle when foreign objects are jammed against its exposed surfaces thereby resisting permanent distortion and consequent loss of performance.

DESCRIPTION OF THE PREFERRED EMBODIMENT

Figure 1:
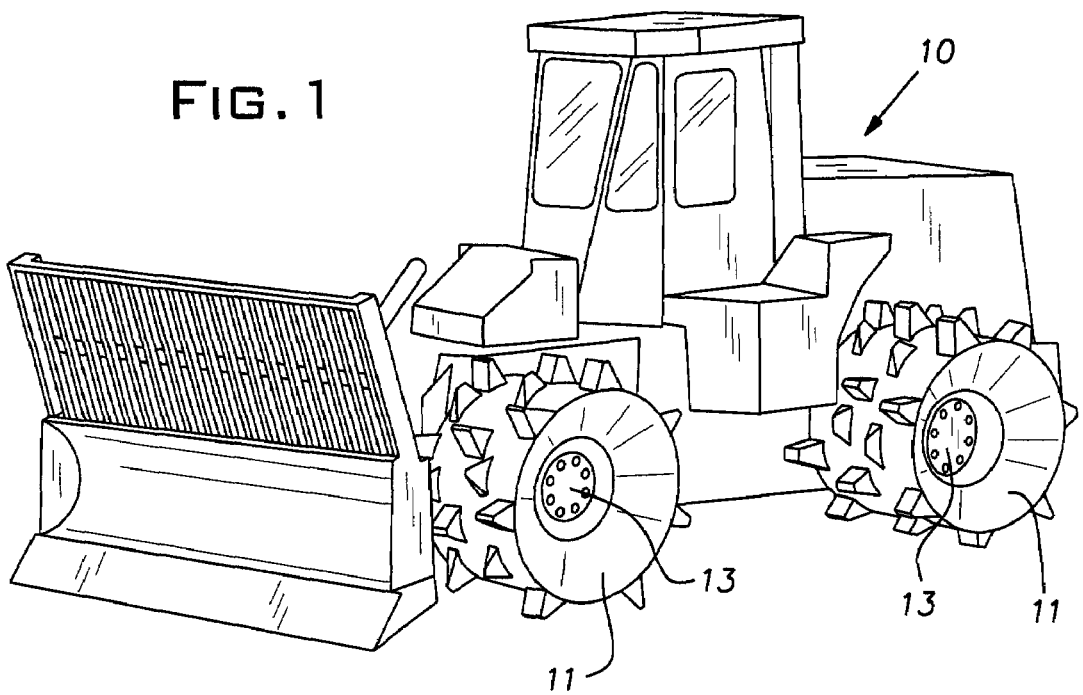
FIG. 1 is a perspective somewhat schematic view of a wheeled tractor used for compacting refuse material in a landfill.

The invention has utility with wheeled tractors, known in the industry as compactors. Compactors are relatively heavy machines, fitted with steel wheels, that are driven back and forth over refuse dumped in a landfill. Compaction of the debris allows more refuse to be received in a given volume of landfill space. A conventional wheeled tractor or compactor 10 is schematically shown in FIG. 1. The compactor 10, as is common, has a pair of axles with each axle carrying a wheel 11 on each side of the machine so that the compactor has four wheels. On large equipment such as manufactured by Caterpillar® under Model Nos. D6 through D12, each side of an axle 12 has a final drive 13 on its outboard end to which a respective wheel 11 is bolted. Rotation of a wheel 11 requires relative rotation between the final drive 13 and a spindle 14 bolted in fixed relation to a housing 16 of the axle. In the case of a Caterpillar compactor, this relative rotation is accommodated by a so-called duo-cone seal 17 that excludes dirt from entering the axle housing 16 and retains lubricant within the axle housing and final drive 13. The duo-cone seal 17 has its sealing surfaces contacting at a plane 18 perpendicular to the axis of rotation of an axle 12, final drive 13, and wheel 11, all of which are common or coaxial.

Figure 2:
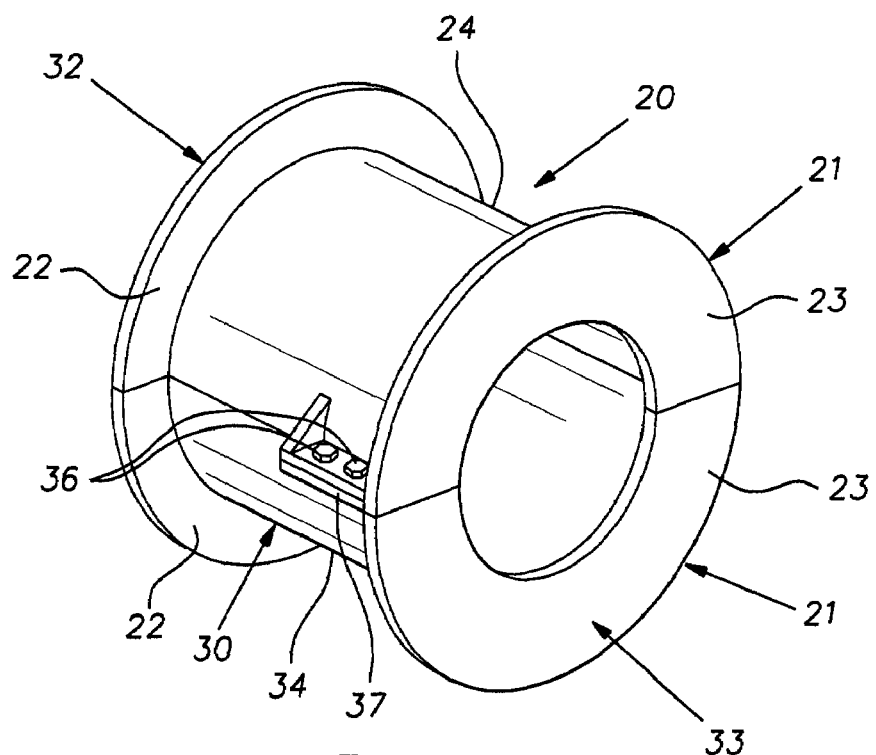
FIG. 2 is a perspective view of an axle seal guard of the invention used at each of the four wheels of the compactor of FIG. 1.
Figure 3:
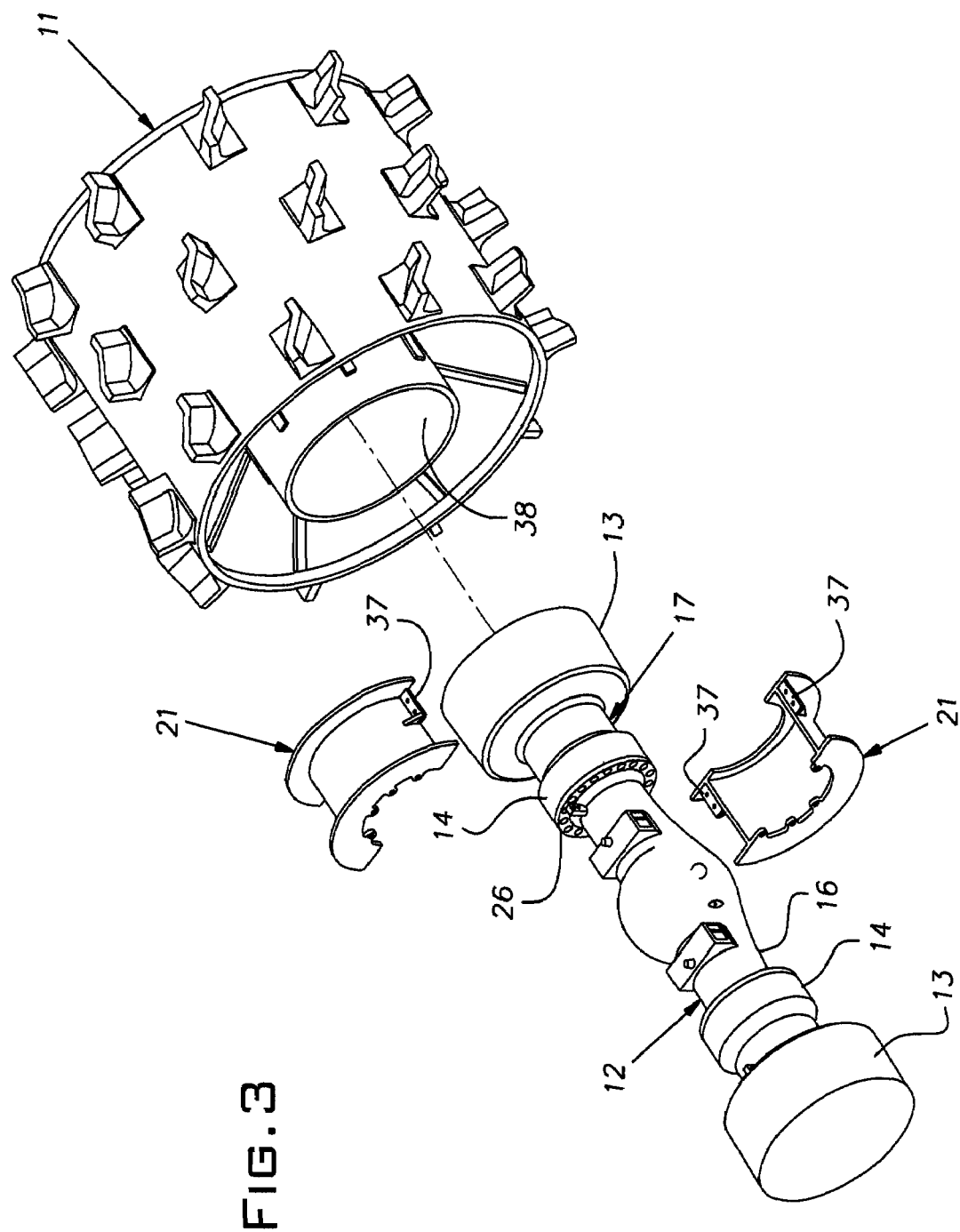
FIG. 3 is an exploded perspective view of the axle seal guard, an axle housing, final drive, and a wheel.
Figure 4:
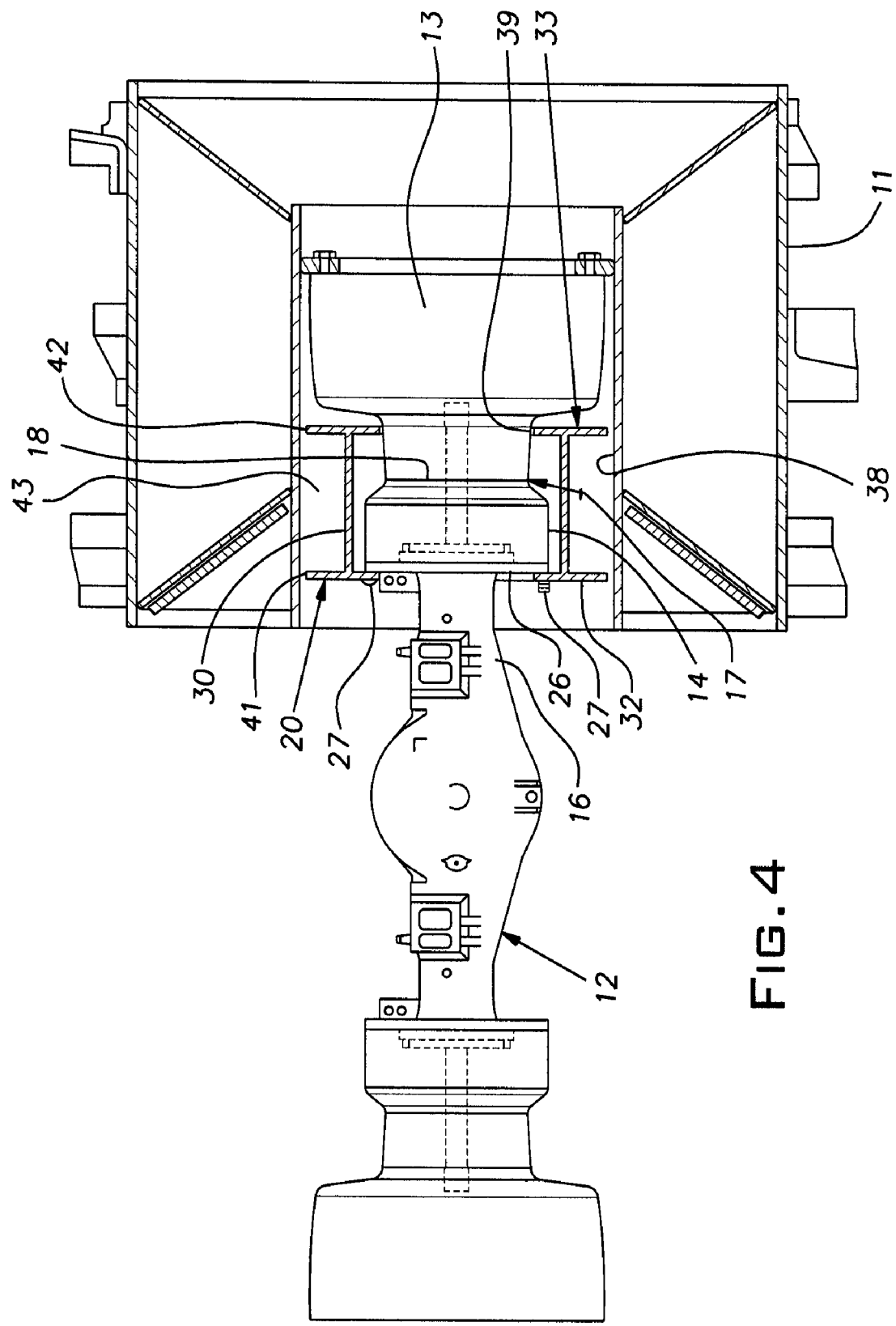
FIG. 4 is a cross-sectional view of the guard shown in its relation to the associated axle housing, final drive, and wheel.

FIGS. 2-4 illustrate details of a guard 20 embodying the invention and arranged to protect the duo-cone seal 17 associated with the final drive 13 of each of the four wheels 11 on a compactor 10. As is conventional, a wheel 11 is removably assembled on a final drive assembly 13 by a plurality of bolts. The guard 20 is preferably made from steel plate or steel castings and is an annular structure comprising two generally circular half sections 21. In the illustrated embodiment, each half section 21 includes semi-circular walls 22, 23 between which is a semi-cylindrical shell 24. The walls 22, 23, and shell 24 can be integrated as a steel weldment or can be cast to shape. The guard half-sections 21 are assembled around an axle housing 16 and mate at a diametral plane so as to make a fully circular structure.

The end walls 22 are bolted to inboard sides of an end flange 26 on the axle housing 16 with bolts 27. Where the tractor 10 is originally manufactured for use as a compactor for landfill operations, it is typically fitted with a flat plate on the end flanges 26. This original plate is removed to allow the end walls 22 to be mounted as shown. Preferably, the inside periphery of each of the end walls 22 is scalloped so that radially outer parts of this inner periphery do not interfere with some of the original bolts used to bolt the spindle 14 to the axle housing 16. This avoids the necessity of removing or at least largely unbolting the final drive 13 to install the guard 20. Radially inward parts of the end walls 22 have holes located to align with some of the original holes in the axle housing end flanges 26 and spindle 14. Bolts are assembled in these aligned holes to fix the guard sections 21 to the axle housing with the end walls 22 directly abutting the axle and flanges 26.

In its assembled state, the guard 20, at an inboard end wall 32, formed by the semi-circular walls 22, is thus fixed to the axle housing by the bolts 27. Each section 21 of the guard 20 is held in place by a plurality of these bolts arranged along a corresponding part of the circular periphery of the axle housing flange 26. The outboard end of the guard, represented by an end wall 33, formed by the semi-circular walls 23, is supported in cantilever fashion from the inboard end wall through the medium of the semi-cylindrical shells 24. The half-sections 21 mate along respective edges in a diametral plane parallel to and extending through the axis of rotation of the wheel 11. Adjacent the outboard end wall 33, the guard half-sections 21 are fixed together by bolts 36 received in flanges 37 extending radially from the edges of the shells 24.

The guard 20 is installed around the axle 12 while the wheel 11 is not mounted on the final drive 13. The outboard end wall 33, comprising the semi-circular walls 23, has an inner circumference that is slightly larger than the local outside diameter of the housing of the final drive 13 that it surrounds, thereby forming a "narrow gap seal" 39 at this location. As used herein, a narrow gap seal is preferably less than ¼", more preferably ³⁄₁₆" or less and, most preferably, less than ⅛" in radial dimension. The outboard and inboard end walls 33, 32, have outer circular peripheries sized relative to an inside diameter of an inner shell 38 of the wheel 11 to similarly produce a "narrow gap seal" 41, 42 at each of these locations. The guard 20 is constructed and arranged to protect the duo-cone seal 17 from entry therein of debris and, ultimately, destruction of this critical part. With particular reference to FIG. 4, it will be understood that the inboard end wall 32 is held tight against the axle flange 26 thereby preventing passage of solid debris through the interface between these bodies into the area of the seal 17. The narrow gap seals 41, 42, formed by the outer periphery of the inboard and outboard walls 32, 33 and the inside surface areas of the inner wheel shell 38, serve to exclude debris from the seal 17. As mentioned, an unprotected duo-cone seal 17 is particularly susceptible to destruction by cable, wire, or other high-tensile strength strand, because such a strand can be caught or entrained by the wheel 11 or material caught on the wheel and wound around the axle. Debris filling the space between the chassis of the compactor 10 and the wheel 11 can press material, including strands, into the interior of the wheel and ultimately into the sealing plane 18 of the duo-cone seal 17.

In the unlikely event that debris or refuse material finds its way or is forced through the narrow gap seal 41, such material is trapped in the annular zone, designated 43, bounded by the end walls 32, 33, semi-cylindrical shells 24 forming a hub 30, and inner wheel shell 38. It is desirable, though believed not as important as the inboard narrow gap seal 41, that the second narrow gap seal 42 is formed by the outboard wall 33. The presence of the outboard wall 33 will confine any strand material that enters the zone 43 and is wrapped onto the hub 30 formed by the semi-cylindrical shells 24 and positively prevent it from reaching the duo-cone seal 17. While improbable, if material passes through the second narrow gap seal 42, it will be obstructed from reaching the duo-cone seal 17 by the third narrow gap seal 39.

The geometry and structure of the disclosed guard 20 has additional benefits. The outboard end wall 33 imparts a high rigidity to the guard 20, making it easier to maintain the narrow gap seals 39, 41 and 42. Radial deflection of the outboard end of the guard 20 caused by unusual force levels is limited by contact between the outboard end wall 33 and the final drive housing 13 thereby adding support to the guard 20. The guard 20, moreover, exhibits high rigidity because of its box-like structure. With the guard hub 30 spaced radially closely to the spindle 14, the volume of the zone 43 is relatively large, giving it the capacity to trap a considerable volume of refuse material which, over time, might be able to accumulate after passing through the narrow gap seal 41.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A guard for the axle seal of a wheeled tractor, the guard being in the form of an annular steel structure constructed and arranged to surround the plane of the seal between a spindle and final drive including a pair of axially spaced flanges having circular outer peripheries of substantially the same diameter, the outer peripheries of the flanges being sized to produce a narrow radial gap seal with a circular interior surface of a wheel rim, a hub extending axially between the flanges and spaced radially inward of said flange outer peripheries, the flanges, hub and interior wheel surface defining an annular space adapted to trap debris passing through the narrow gap seal and enable strand-like material to be wound and thereby trapped on said hub and axially constrained by said flanges.

2. A guard as set forth in claim 1, being arranged to be fixed to a non-rotating part of the axle of the tractor at a location proximal to one of said flanges and distal to the other of said flanges and having a circular flange element being sized to form a narrow gap seal with a circular rotating surface of a final drive.

3. A guard for the axle seal of a wheeled tractor, the guard being in the form of an annular steel structure constructed and arranged to surround the plane of the seal between a spindle and final drive including a pair of axially spaced flanges having circular outer peripheries, at least one of the outer peripheries of the flanges being sized to produce a narrow gap seal with a circular interior surface of a wheel rim, a hub extending axially between the flanges and spaced radially inward of said flange outer peripheries, the flanges, hub and interior wheel surface defining an annular space adapted to trap debris passing through the narrow gap seal and enable strand-like material to be wound and thereby trapped on said hub and axially constrained by said flanges, the guard being arranged to be fixed to a non-rotating part of the axle of the tractor at a location proximal to one of said flanges and distal to the other of said flanges and having a circular flange element being sized to form a supplemental narrow gap seal with a circular rotating surface of a final drive, said flange element being co-planar with and extending radially inward of said other flange that is distal from said non-rotating part of the axle of the tractor.

4. A guard as set forth in claim 3, wherein elements of said hub and flanges are permanently joined together.

5. A guard as set forth in claim 2, being spilt at a diametral plane into two semi-circular sections.

6. A guard as set forth in claim 5, wherein said sections have provisions for being bolted together at locations adjacent said other flange.

7. A compactor having a pair of axles and a set of four wheels, each of the wheels being mounted on outboard ends of the axles, a spindle fixed on the outboard end of each axle, a final drive rotatably supported on the spindle of each axle, a duo-cone seal between each spindle and its respective final drive, each wheel being bolted to the respective final drive and having a circular inner shell extending axially over and concentric about the duo-cone seal, a rigid steel guard bolted to each axle housing, the guard having a hub extending axially in the wheel inner shell over the duo-cone seal and a pair of flanges of substantially equal diameter spaced axially from one another and extending radially outward of the hub, the flanges being arranged to establish a narrow radial gap seal with the inner wheel shell, and retard debris from reaching the duo-cone seal, the flanges and hub cooperating to form an annular zone within the inner wheel shell, said annular zone forming a trap for strand-like materials entrained by the wheels and wrapped over the axis of the axle.

8. A compactor as set forth in claim 7, including two successive narrow gap seals in a potential path of debris from an area outside a wheel inner shell and the duo-cone seal.

9. A compactor as set forth in claim 8, wherein said guard has a third narrow gap seal radially between said guard and said final drive.

\* \* \* \* \*